United States Patent
Appenrodt et al.

(10) Patent No.: US 6,597,984 B2
(45) Date of Patent: Jul. 22, 2003

(54) MULTISENSORY CORRELATION OF TRAFFIC LANES

(75) Inventors: Nils Appenrodt, Ulm (DE); Joerg Berner, Stuttgart (DE); Klaus Mezger, Stuttgart (DE); Gerd Wanielik, Freiberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/912,001

(22) Filed: Jul. 24, 2001

(65) Prior Publication Data

US 2002/0067292 A1 Jun. 6, 2002

(30) Foreign Application Priority Data

Jul. 25, 2000 (DE) .......................................... 100 36 042

(51) Int. Cl.[7] .............................................. G01C 21/00
(52) U.S. Cl. ........................ 701/207; 701/213; 701/214
(58) Field of Search ........................... 701/207; 21/202, 21/213, 214, 216, 220, 221, 223; 340/425.5, 435, 436

(56) References Cited

U.S. PATENT DOCUMENTS

| 5,163,319 | A | 11/1992 | Spies et al. .................... 73/146 |
| 5,229,941 | A | 7/1993 | Hattori ........................ 364/424 |
| 6,249,214 | B1 | * 6/2001 | Kashiwazaki ............ 340/425.5 |
| 6,493,458 | B2 | * 12/2002 | Yasui et al. .................. 382/104 |

FOREIGN PATENT DOCUMENTS

| DE | 3738221 | 6/1989 |
| DE | 3912353 | 11/1989 |
| DE | 4127168 | 2/1993 |
| DE | 19749086 | 8/1999 |
| DE | 19906614 | 9/1999 |
| EP | 0841648 | 5/1998 |
| EP | 1098168 | 5/2001 |
| GB | 2289999 | 12/1995 |
| GB | 2318008 | 4/1998 |
| JP | 58099715 | 6/1983 |
| JP | 409243389 | * 9/1997 |
| JP | 10325869 | 12/1998 |
| WO | 9800729 | 1/1998 |

OTHER PUBLICATIONS

Nikolova, M. And Hero, Alfred III: "Segmentation of road edges from an Vehicle–mounted imaging radar", in Statistical Signal and Array Processing, 1998, IEEE, pp. 212–215.

* cited by examiner

*Primary Examiner*—William A. Cuchlinski, Jr.
*Assistant Examiner*—Marthe Marc-Coleman
(74) *Attorney, Agent, or Firm*—Davidson, Davidson & Kappel, LLC

(57) ABSTRACT

To increase convenience and safety in vehicles, sensor systems for environmental sensing which feature an intelligent scene interpretation are increasingly gaining importance. To determine the position of a motor vehicle with respect to the traffic lane, the data from a digital road map coupled with a navigation system is fused with the data delivered by a distance-resolving sensor. In this context, the signature and the distance-related variation of the received signal of the distance-resolving sensor are evaluated for determining the distance from the road edge. The advantage of the present invention ensues from the possibility for a vehicle to autonomously determine its instantaneous position with respect to the traffic lane, without falling back on a stationary traffic infrastructure (marking lines reflectors).

19 Claims, 2 Drawing Sheets

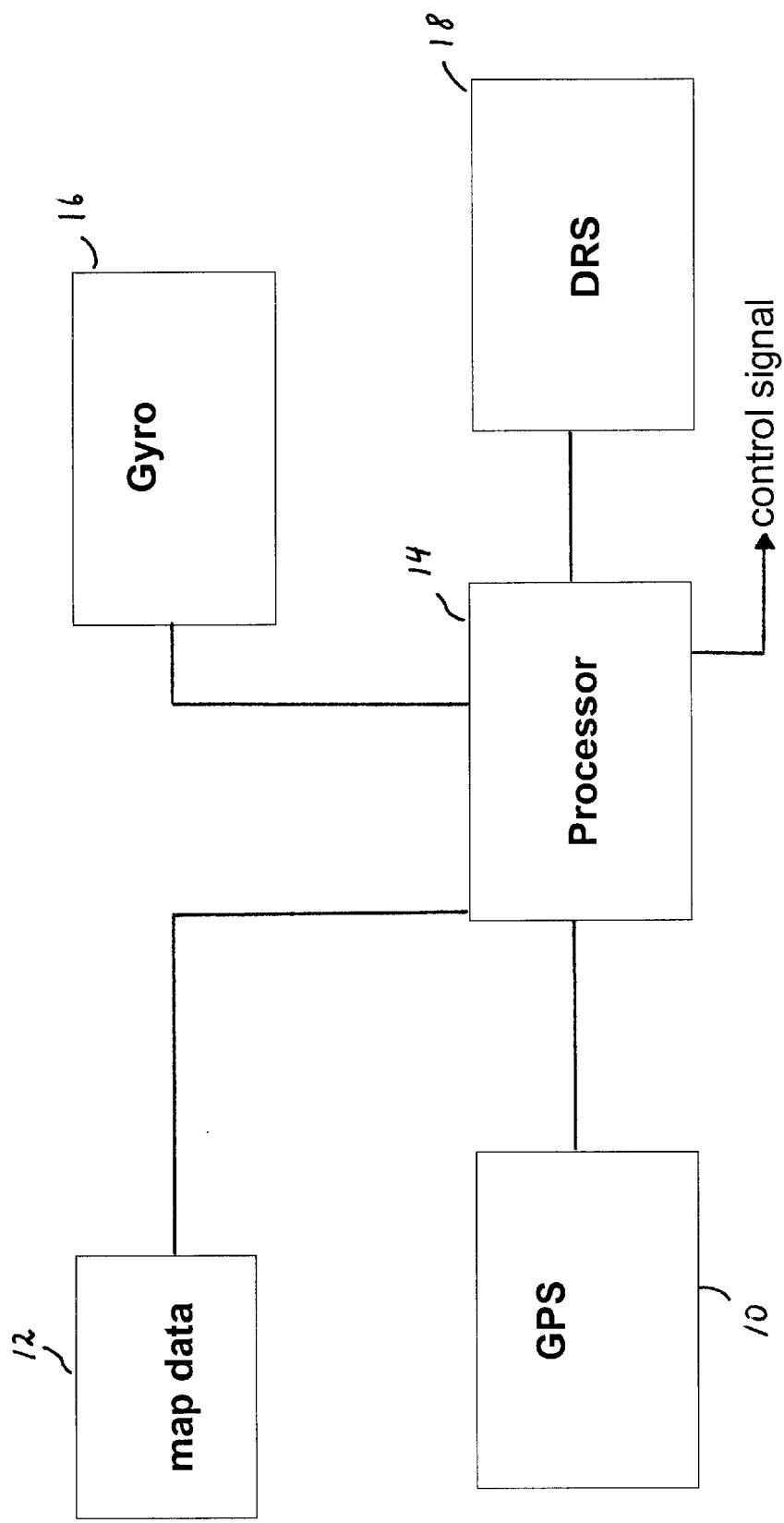

MULTISENSORY CORRELATION OF TRAFFIC LANES

BACKGROUND OF THE INVENTION

The present invention relates to a method for determining the position of a motor vehicle with respect to a traffic lane, as well as to a device which is suitable for carrying out the method.

To increase convenience and safety in vehicles, sensor systems for environmental sensing which feature an intelligent scene interpretation are increasingly gaining importance.

German patent document DE 19749086 C1 describes a system for acquiring data which are indicative of the course of a traffic lane, containing a traffic lane detection sensor system in the form of a video camera and an object position sensor system. In this context, the traffic lane detection sensor system is composed of a video camera and the object position sensor system is composed of a radar sensor which measures at least the distance from an object located ahead of the vehicle and its heading angle with respect to the vehicle's moving direction. Within a vehicle motion model, this sensor data is fused for deriving a position estimate of the vehicle therefrom.

Important additional information on the vehicle's surroundings can be acquired with the aid of navigation systems. In this context, the positional resolution is generally precise enough to correlate the vehicle to the existing digital road map. However, if the vehicle enters a transition or branch region where, for example, a side road branches from a major road, then it is difficult to determine whether the vehicle continues to move forward on the major road or whether it moves toward the branching road or side road. For improved scene interpretation, it is therefore required for the navigation data to be usefully supplemented by additional sensor data.

The method described in German Patent Application DE 19906614 A1 therefore compares the data of a video-based traffic lane detection sensor system which detects the marking lines at the road edge to the data of a digital road map which is in communication with a navigation device. This makes it possible to determine the position of the vehicle with respect to the marking lines.

On the other hand, Japanese publication JP10325869 introduces a system in which the traffic lane detection sensor system connected to a digital road map is composed of a radar sensor. First of all, this makes the system suitable in all weather conditions (with no significant restriction by fog) and, secondly, independent of the existence of boundary lines at the road edge. However, this method has the disadvantage that radar-reflection bodies must be installed at equal intervals at the road edge.

SUMMARY OF THE INVENTION

An object of the present invention is to find a method for determining the position of a motor vehicle with respect to the traffic lane in which the data from a digital road map coupled with a navigation system is used with data delivered by a distance-resolving sensor.

The present invention provides a method for determining the position of a motor vehicle with respect to a traffic lane, in which a first correlation of the motor vehicle to a road is carried out via a road map which is coupled with a navigation system. This first correlation is made more precise by subsequently determining the distance of the motor vehicle from the road edge via a distance-resolving sensor. The signature of the received signal of the distance-resolving sensor is evaluated for determining the distance from the road edge.

In this context, the signature of the distance-resolving sensor is evaluated for determining the distance from the road edge.

The advantage of the present invention ensues from the possibility for a vehicle to autonomously determine its instantaneous position with respect to the traffic lane without falling back on a stationary traffic infrastructure (marking lines, reflectors).

Within the scope of the method according to the present invention, a distance-resolving sensor, preferably a millimeter wave sensor (however, a radar sensor or a distance-resolving sensor on the basis of a laser, for example, LIDAR, is also conceivable) for determining the vehicle distance from the road edge is combined with a digital road map coupled with a navigation system for position determination. Suitable as navigation system is, in particular, a DGPS (global positioning) system as is already frequently used in modern motor vehicles. The method according to the present invention advantageously eliminates this lack of clarity by correlating the map data with the distance estimate of a distance-resolving sensor. In this manner, the lateral vehicle coordinates and the vehicle orientation can be clearly determined. This is also important, in particular, if the intention is to detect whether a vehicle driving ahead is traveling on one's own or on the adjacent lane or whether stationary obstacles are located on one's own traffic lane.

Advantageously, the method according to the present invention additionally may use the data of a gyroscopic system integrated in the vehicle to be able to better determine the orientation of the vehicle on the road. In lieu of a gyroscopic system, it is, of course, also conceivable to use the position data of other systems and sensor technology contained in the motor vehicle.

Used as estimate of the distance of the motor vehicle from the road edge is, in an inventive manner, the distance of the range window within the received signal of the distance-resolving sensor in which the signature of the received signal begins to change significantly. In this context, it is conceivable for a significant change to be identified when the intensity of the received signal increases monotonously. This is a reliable procedure since a road surface appears to be smooth to the electromagnetic waves emitted by the radar sensor and, therefore, reflects back relatively little energy to the sensor while the reflections at the generally inhomogeneous road edge (gravel, grass, road pavement/curb edge transition) are significantly stronger. To prevent errors in the interpretation of the received signals resulting, for example, from signal interference, it is also conceivable for a monotonous increase in the signal to be rated as significant only if the increase in the signal energy takes place over at least two range windows. A useful selection of the number of range windows ensues in connection with the instantaneous distance resolution of the sensor system. Correspondingly, it is also conceivable in an advantageous manner to compute a distance estimate with respect to the monotonous transition of the road pavement to the road edge using suitable estimation methods known from image processing, the distance estimate then being considerably more accurate in its distance resolution than the resolution of the distance-resolving sensor. Using such an edge estimate whose resolution lies in the subpixel range, it is possible to achieve an increase in resolution by a factor 5 to 10.

However, it is in particular also possible for the received signal of the distance-resolving sensor to be examined for the presence of signatures which are typical of a road edge. In this context, it is particularly advantageous for the sensor to be configured to be sensitive to polarization so that the polarization of the received signal can be examined within the scope of the signature analysis. Investigations have shown that the polarization signatures of road surfaces and of textures typically found at the road edge (grass, crushed stone) differ significantly.

Advantageously, the course of the road can be determined from the chronological sequence of the distance information. In this context, it is conceivable for the course of the road to be determined with the aid of the method of least error squares or to use a Kalman filter which is optimized for this task. In this context, it is particularly beneficial for the Kalman filter to be adapted to data as, for example, curve parameters which is obtained from the road map. In the event that the sensor is temporarily not able to detect a road edge, for example in the region of road junctions, it is advantageously also conceivable to temporarily extrapolate the course of the road using the preceding distance measurements.

The method according to the present invention can be used in a particularly beneficial manner in that the knowledge of the position of the vehicle with respect to the traffic lane is made available to technical systems as a control parameter. In this context, systems would be conceivable which mask the detection space of beam-based sensors (for example, radar, LIDAR or active infrared sensor technology). In this manner, it is made possible to discriminate all relevant objects on the road from those outside of the road, which results in a considerably more reliable detection performance of an overall system. Such a procedure makes it possible for a beam alignment with respect to the course of the roadway to be accurately determined and for the resulting advantages to be accurately implemented, for example, in the correlation of objects. In addition to this advantage, such a map-assisted sensor system is able to advantageously increase the capabilities of a sensory scene interpretation. A system can, for example, prevent a false recognition such as an object which is erroneously classified as a "stationary object" if, for example, an object "bridge" from the map data corresponds with the position of the sensor recognition. In a correspondingly advantageous manner, the signals of the distance-resolving sensor can be better interpreted through map data based knowledge of curve radii of the driveway or special infrastructural conditions of the vehicle's surroundings so that the probability of misinterpretation can be minimized.

For implementing the method according to the present invention, it is conceivable for a separate sensor system which is specifically designed for this application to be mounted on the vehicle. However, a particular advantage of the method according to the present lies in its quality of advantageously combining partial data of individual sensors. This makes it possible to use sensor technology which already exists in the vehicle (such as ART, Distronic, navigation system, short-range and environment sensor technology) with only small modifications. Thus, for example, it is conceivable for the radiation pattern of a ranging radar to be extended in such a manner that an additional, individually evaluable radiation lobe is directed toward the road edge.

The present invention also provide a device for carrying out a method for determining the position of a motor vehicle with respect to a traffic lane, comprising an on-board navigation system, in which a first correlation of the motor vehicle to a road is carried out via road map data coupled to the navigation system, and a distance-resolving sensor coupled to the on-board navigation system, the distance-resolving sensor receiving a received signal for determining a distance to a road edge, the first correlation and the distance to the road edge being used to determine position of the motor vehicle.

The device thus can carry out the method of the present invention in that sensors which already exist in the vehicle and which are used there, for example, for navigation and ranging tasks, can be connected together, so that one of the sensors is suitable for acquiring the signature which represents the transition between the road surface and the road edge.

BRIEF DESCRIPTION OF THE DRAWINGS

FIG. 2 shows an embodiment of the device of the present invention.

DETAILED DESCRIPTION

Figure 1:
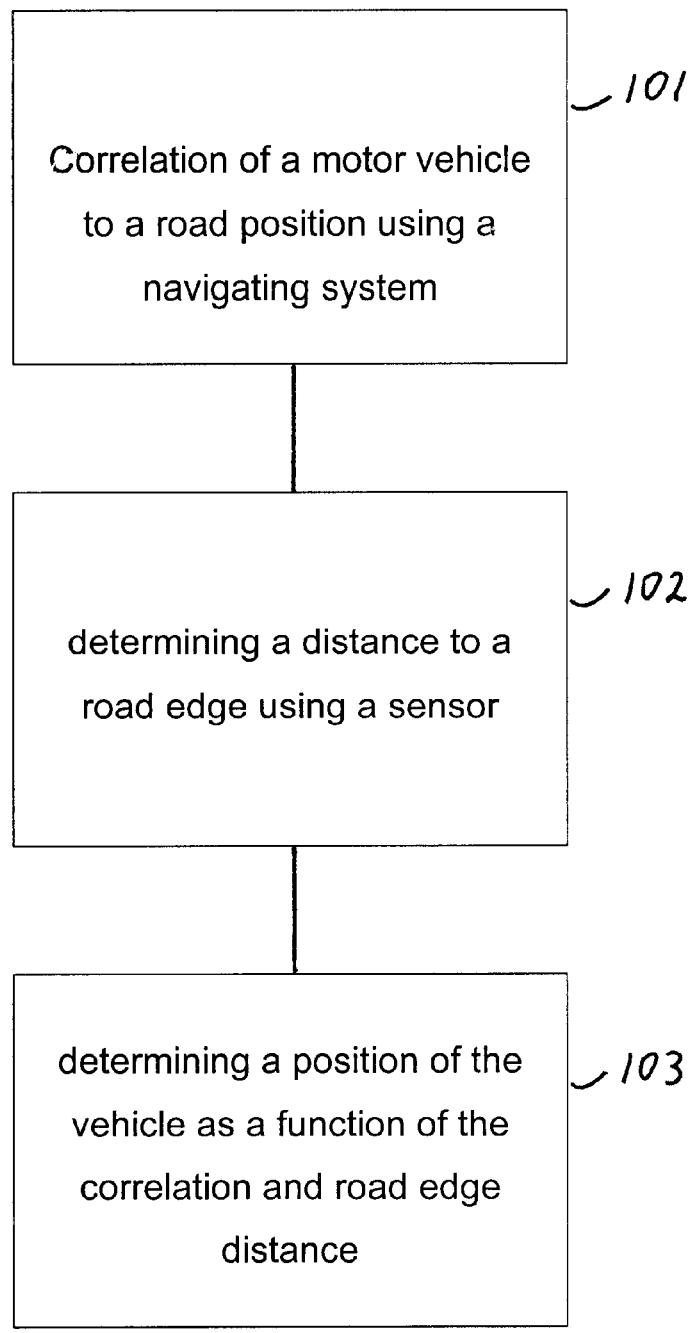
FIG. 1 shows a flowchart of the method of the present invention.

FIG. 1 shows a flowchart of the method of the present invention.

In step 101, a first correlation of the motor vehicle position is determined by using a navigation system, preferably using a GPS device and map data.

In step 102, the road edge distance is determined using an on-board distance sensor.

In step 103, the position of the vehicle is determined as a function of both the first correlation and the road edge distance. For example, the GPS and map data can be used to determine which road the vehicle is located on, and the road edge distance used to determine the lane of the road on which the car is located.

FIG. 2 shows the device of the present invention, which includes a navigation system 10, for example a GPS device, a map data storage device 12, a gyroscope 16 and a distance-resolving sensor 18, for example a radar-based system. A processor 14, which can include a signal processor and a Kalman filter, can be used to determine the position of the vehicle as discussed above and output a control signal.

What is claimed is:

1. A method for determining the position of a motor vehicle with respect to a traffic lane, comprising the steps of:
   correlating a position of the motor vehicle with respect to a road as a function of road map data and a navigation system, and
   determining a distance of the motor vehicle from the road edge via a distance-resolving sensor having a received signal, a signature of the received signal of the distance-resolving sensor being evaluated for determining the distance from the road edge, a more precise position of the vehicle being determined as a function of the correlation and the distance from the road edge.

2. The method as recited in claim 1, further comprising determining a variation in intensity of the received signal.

3. The method as recited in claim 1 further comprising receiving further position data from a further on-board sensor for determining the position.

4. The method as recited in claim 3 wherein the further on-board sensor includes a gyroscope.

5. The method as recited in claim 1 wherein a range window distance of a range window within the received signal of the distance-resolving sensor is used as an estimate of the distance of the motor vehicle from the road edge, the signature of the received signal changing significantly within the range window.

6. The method as recited in claim 5, wherein the significant change is identified when an intensity of the received signal increases monotonously.

7. The method as recited in claim 6, wherein the monotonous increase takes place over at least two range windows.

8. The method as recited in claim 6 wherein the distance estimate with respect to the monotonous transition of the road pavement to the road edge is computed using an image-processing estimation method, the distance estimate having a higher resolution than the resolution of the distance-resolving sensor.

9. The method as recited in claim 5 wherein the significant change is identified when the received signal features a signature representative of a road edge.

10. The method as recited in claim 9 further comprising analyzing a polarization of the received signal.

11. The method as recited in claim 1 wherein a course of the road is determined from a chronological sequence of the distance information.

12. The method as recited in claim 11 wherein the course of the road is determined using a least error square determination.

13. The method as recited in claim 12, wherein the Kalman filter is adapted to data such as curve parameters which is obtained from the digital road map.

14. The method as recited in claim 11 wherein the course of the road is determined using a Kalman filter.

15. The method as recited claim 1 further comprising making available the position of the vehicle with respect to the traffic lane to further technical systems as a control parameter.

16. The method as recited in claim 15 wherein a further technical system is controlled which masks the detection space of beam-based sensors.

17. The method as recited in claim 15 wherein a further technical system is a traffic analyzer.

18. A device for carrying out a method for determining the position of a motor vehicle with respect to a traffic lane, comprising:
   an on-board navigation system, in which a first correlation of the motor vehicle to a road is carried out via road map data coupled to the navigation system, and
   a distance-resolving sensor coupled to the on-board navigation system, the distance-resolving sensor receiving a received signal for determining a distance to a road edge, the first correlation and the distance to the road edge being used to determine position of the motor vehicle.

19. The device as recited in claim 18 wherein the device further includes a signal processing unit for evaluating individually the signature acquired by the sensor from the transition between the road surface and the road edge.

* * * * *